No. 655,714. Patented Aug. 14, 1900.
P. C. KEMPER & W. E. RADER.
SAW SET.
(Application filed May 3, 1900.)
(No Model.)
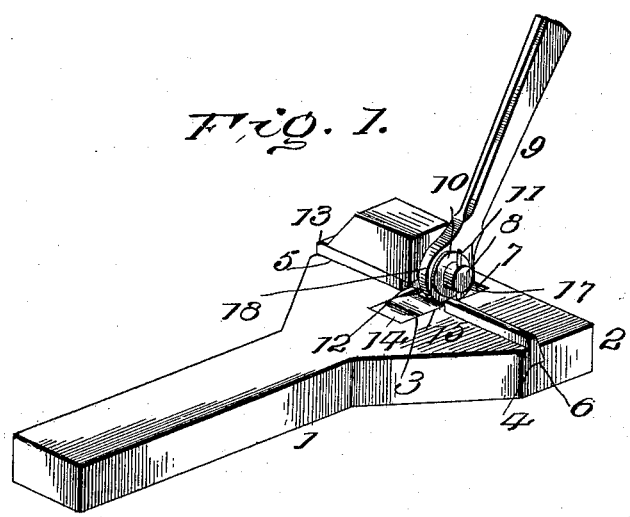
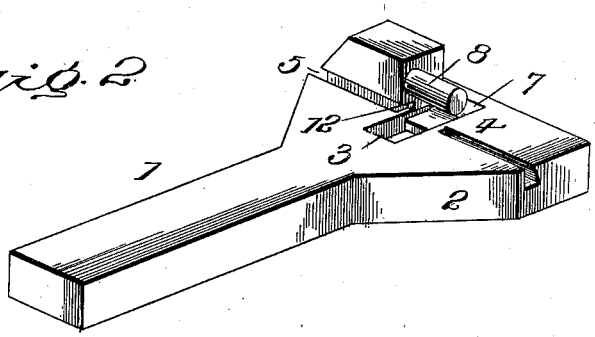
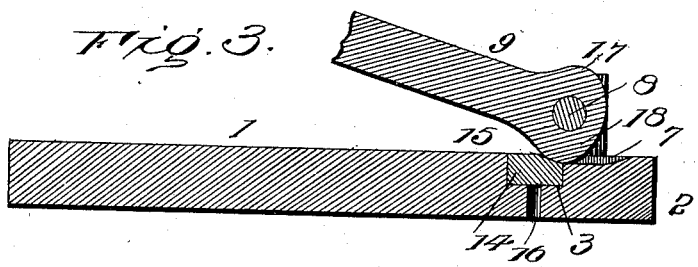
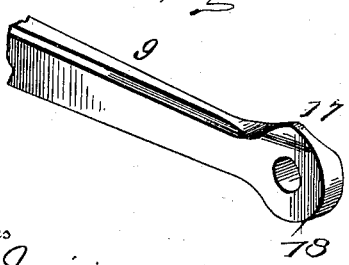
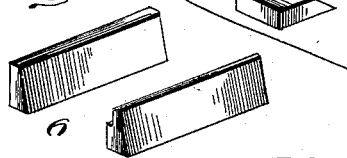
Witnesses
Jno. Innie
Gladys L. Thompson
Inventors
P. C. Kemper
W. E. Rader
By R. S. & A. B. Racey
Attorneys
THE NORRIS PETERS CO., PHOTO-LITHO., WASHINGTON, D. C.

UNITED STATES PATENT OFFICE.

PETER C. KEMPER AND WILLIAM EDWARD RADER, OF COLUMBIA, MISSOURI.

SAW-SET.

SPECIFICATION forming part of Letters Patent No. 655,714, dated August 14, 1900.

Application filed May 3, 1900. Serial No. 15,373. (No model.)

*To all whom it may concern:*

Be it known that we, PETER C. KEMPER and WILLIAM EDWARD RADER, citizens of the United States, residing at Columbia, in the county of Boone and State of Missouri, have invented certain new and useful Improvements in Saw-Sets; and we do hereby declare the following to be a full, clear, and exact description of the invention, such as will enable others skilled in the art to which it appertains to make and use the same.

This invention has relation to the class of tools designed for setting and swaging saws, the purpose being the provision of an implement for the purpose aforesaid easily operable, adjustable to saws having teeth of different sizes, uniform in operation, so as to set the teeth with precision and insure an even cut and avoid jerky movements when the saw is in service, effective, durable, and not susceptible to easy derangement.

For a full description of the invention and the merits thereof and also to acquire a knowledge of the details of construction of the means for effecting the result reference is to be had to the appended description and drawings hereto attached.

While the essential and characteristic features of the invention are necessarily susceptible of modification, still the preferred embodiment of the invention is illustrated in the accompanying drawings, in which—

Figure 1 is a perspective view of a saw-set embodying the vital features of the invention. Fig. 2 is a perspective view of the bed or base of the tool stripped of the operating parts. Fig. 3 is a longitudinal section, parts being broken away. Fig. 4 is a detail perspective view of the pivotal end of the setting-lever. Fig. 5 is a detail view in elevation showing anvils of different thicknesses. Fig. 6 is a detail view showing different forms of guide-strips.

Corresponding and like parts are referred to in the following description and indicated in all the views of the drawings by the same reference characters.

The bed or base 1 of the implement is provided with an extension 2, either formed with or secured thereto, and has a depression 3 and transversely-alined seats 4 and 5, the latter being approximately of wedge form in cross-section, so as to retain in place guide-strips 6, slipped endwise therein. The depression 3 is located inside of the line of the seats 4 and 5, and a tapering depression 7 extends therefrom toward the outer end of the bed. A spindle 8 projects from the inner end of the part 2 parallel with the base 1 and with the seats 4 and 5. This spindle overhangs the tapering depression 7 and forms a support for the setting-lever 9, which is held upon the said spindle by a washer 10 and a pin 11, the latter passing transversely through an opening formed in the said spindle. The projection 2 is formed in its inner side with a groove 12 in communication with the seat 4, so as to receive a guide-strip 13 for a purpose similar to the strip 6. It is not necessary to have the combined seat 4 and 12 of wedge form in transverse section, since the strip 13 is held in place against vertical and lateral movement by the overhanging wall of the groove 12.

The guide-strips 6 and 13 are preferably of wood, so as to obviate dulling the points of the saw-teeth after being sharpened. The portion of the guide-strips projecting above the plane of the base 1 is adapted to have the face against which the teeth of the saw bear disposed to come nearer to or farther away from the plane of the inner side of the extension 2, according to the length of the saw-teeth, whereby the same can be properly set according to the character of the saw. The guide-strips are made interchangeable and the upper portion of the several strips varies in thickness, whereby provision is had to enable the teeth to be projected a greater or less distance beneath the cam portion of the setting-lever. The strips being of wood can be readily replaced when worn at a trifling cost, and the user can vary the relative position of the engaging face of the strips by cutting the same away should it be required to have the teeth of the saw to be set project beneath the cam portion of the setting-lever a greater distance than primarily allowed for by the strips in position and at hand.

The anvil 14 is a block of hardened steel or chilled iron and is of a size to snugly fit within the recess 3, in which it is held by friction. The inner upper face of the anvil is beveled, as shown at 15, to form a seat for the teeth as set. The height of the block and the relative inclination of the part 15 will depend upon the character of saw to be set or swaged. In order to adapt the tool for operation upon different kinds of saws, anvils 14, of different thicknesses and degree of bevels 15, will be provided, so that the proper one may be selected and placed in position as required. In order that a tightly-fitting anvil may be dislodged when required, an opening 16 is formed in the base and is disposed about centrally of the recess 3 and is designed to receive an instrument of the character of a punch when the anvil is to be displaced. The punch or like implement (not shown) is passed through the opening 16, and its outer end is struck a smart blow by a hammer or the like, thereby unseating the anvil and enabling a selected one to be placed in position.

The setting-lever 9 is pivotally mounted upon the spindle 8 and its pivotal end is provided with a series of cam portions 17 and 18, of different widths, according to the size of tooth to be acted upon. For coarse teeth the wide-faced cam portion 18 is utilized and for finer teeth the narrow-faced cam portion 17 is brought into working relation with the anvil 14. In order to enable the different cam portions to be brought into proper position for coöperation with the anvil, the setting-lever is mounted upon the spindle 8 in such a manner as to be reversed, whereby one or the other of the cam portions may be positioned so as to lie adjacent to the bed 1 when the free end of the setting-lever is in contact therewith.

The base or bed 1 is preferably of oblong form and comprises a contracted portion constituting a shank and a widened portion forming the head and receiving the working parts, such as the projection 2, anvil 14, and guide-strips 6 and 13. The depression 7 is located opposite the projection 2 and provides clearance for the cam portions of the setting-lever when the tool is in operation.

Having thus described the invention, what is claimed as new is—

1. In a saw-set, a base having a seat in its upper face of wedge form in cross-section, and provided with swaging mechanism, and a guide having its base portion removably fitted in the said seat and having its upper portion projecting above the plane of the base, substantially as described.

2. In a saw-set, a base having a seat in its upper face of wedge form in cross-section, and provided with swaging mechanism, and a guide having its base portion removably fitted in the said seat and having its upper portion projecting above the plane of the base, and cut away on its inner or rear face, as and for the purpose described.

3. In a saw-set, a base having an anvil, and a setting-lever reversibly fulcrumed upon the base and provided with a plurality of different-sized cam portions to be brought into action by differently positioning the said lever, substantially as specified.

4. The herein-described saw-set, comprising a base having a recess, transversely-alined seats at the sides of the recess, and having a projection at one side of the recess, an anvil removably fitted in the said recess, guide-strips detachably fitted in the said seats, and a lever reversibly fulcrumed to the said projection and having a plurality of cam-faces to be brought into active operation by differently positioning the lever, substantially as specified.

In testimony whereof we affix our signatures in presence of two witnesses.

PETER C. KEMPER.
WILLIAM EDWARD RADER.

Witnesses:
J. A. PHILLIPS,
H. E. WRIGHT.